United States Patent
Schuster et al.

(10) Patent No.: US 6,567,399 B1
(45) Date of Patent: May 20, 2003

(54) HI-FIDELITY LINE CARD

(75) Inventors: Guido Schuster, Des Plaines, IL (US); Ikhlaq Sidhu, Vernon Hills, IL (US); Jerry Mahler, Prospect Heights, IL (US); Jacek Grabiec, Chicago, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/305,870

(22) Filed: May 5, 1999

(51) Int. Cl.[7] ................................................ H04J 13/00
(52) U.S. Cl. ...................... 370/352; 370/355; 370/356
(58) Field of Search ................................ 370/352–356, 370/401, 466; 375/354; 704/230, 212; 707/501.1

(56) References Cited

U.S. PATENT DOCUMENTS

| | | | | |
|---|---|---|---|---|
| 5,689,534 A | * | 11/1997 | Anderson et al. ............ | 375/354 |
| 6,128,317 A | * | 10/2000 | Mackre ...................... | 370/466 |
| 6,199,076 B1 | * | 3/2001 | Logan et al. ............ | 707/501.1 |

* cited by examiner

Primary Examiner—Salvatore Cangialosi
(74) Attorney, Agent, or Firm—McDonnell, Boehnen, Hulbert & Berghoff

(57) ABSTRACT

A high-fidelity voice/audio communication system including a high-fidelity SLIC (HSLIC) device that combines traditional BORSCHT functionality with high fidelity sampling and compression techniques. The HSLIC preferably resides on a single plug-in line card contained within a multi-cards chassis. The line card includes an analog interface that connects to a two-wire subscriber line, a high fidelity codec for sampling the analog signal at a high resolution and converting high rate digital signals to an analog signal, a voice processing client running on a microprocessor and associated digital memory. The high fidelity codec preferably has a sample rate of at least twenty thousand samples per second, and no less that 250 quantization levels. The voice processing client preferably includes an Internet Protocol (IP) processing client, Session Initiation Protocol (SIP) client, a Real Time Protocol (RTP) client, and other components of a communication protocol stack for establishing a connection over a packet based network by way of the network interface circuit. The line card establishes a high fidelity audio connection by sending an invite request to a proxy server; receiving an okay signal indicating that the request was received; sending an acknowledge signal; quantizing audio information at a sampling rate greater than twenty thousand samples per second with a resolution of no less than 4096 quantization levels; and, packetizing the quantized data for transmission to a remote device.

14 Claims, 3 Drawing Sheets

HI-FIDELITY LINE CARD

FIELD OF INVENTION

This invention relates in general to telephony communication networks and more particularly, it is directed to providing a system capable of hi-fidelity audio transmission over existing switched circuit and packet networks.

BACKGROUND OF THE INVENTION

The public switched telephone network (PSTN) was designed during the 1970s. It operates by converting a user's voice to digital information by sampling the analog waveform, transmitting the digital information through the network, and converting it back to an analog waveform at the destination location. A subscriber line interface card (SLIC) typically samples the subscriber's signal at the central office (CO) or other similar facility such as a private branch exchange (PBX). The SLIC samples the audio waveform at a rate of 8 kHz, and produces eight-bit octets for each sample using coding schemes known as $\mu$-law or A-law, resulting in a total bit rate of 64 KBPS. These data bits are transmitted through the network, and at the distant end location the remote SLIC reconstructs the analog signal for analog transmission to the remote subscriber. The sampling rate and quantization scheme used by SLIC devices were chosen to provide acceptable quality voice transmission.

The 8 kHz sampling rate used by the PSTN provides reconstruction of signals up to approximately 4 kHz. However, the human ear is capable of discerning signals with energy content up to approximately 20 kHz, and the human voice can generate sounds up to about 10 kHz. The PSTN audio transmission capabilities, while adequate for subscriber-to-subscriber communication and message comprehension, are well below human capacities with respect to dynamic range and frequency content.

In the existing PSTN, each telephone or other communication device ("subscriber unit") is typically interconnected by a pair of wires ("tip" and "ring" wires or, cooperatively, "subscriber lines," "subscriber loop" or "phone lines") through a series of equipment to a switch at a local telephone CO. At the CO, the tip and ring lines are interconnected to a SLIC, which provides required functionality to the subscriber unit. The switches at the central offices are interconnected to provide a network of switches thereby providing communications between, e.g., a local subscriber and a remote subscriber.

The functions served by the SLIC are commonly referred to as BORSCHT functionality, an acronym for Battery supply (or talking battery), Overvoltage protection, Ringing current supply, Supervision of subscriber terminal, Coder and decoder (Codec), Hybrid (2-wire to 4-wire conversion), and Testing. Generally, these functions include talking battery, ring voltage, ring trip, off-hook detection, and call progress signals such as ringback, busy, and dial tone. In many business office environments, the small-scale function of a central office is assumed by a PBX system, which, in turn, may include a number of SLICs to provide interconnected subscriber units with the required functionality.

Analog subscriber units generate and receive analog signals. While most modern telephone networks are digital and route digital signals from point to point, the subscriber units are still predominantly analog. This is possible because, as mentioned above, the analog signal generated by an analog subscriber unit is converted to digital form for transmission through the network, and is converted at the remote location back to analog form for transmission over the subscriber loop for reception by a remote analog subscriber unit. The analog signals generated and received by analog subscriber units generally take the form of voice frequency signals for end-to-end communications between local and remote subscriber units. Such signals generally represent human speech, or may be modulated signals which are treated by the phone network as if they were ordinary speech signals.

Other analog signals generated or received at the analog subscriber units are supervisory signals that are not intended for transmission to a remote terminal. Rather, they are designed to communicate with the network to enable functions such as call initiation, call progress indication, and call termination. These signals include those provided by, or through, a SLIC such as (i) "talk battery voltage" which provides power to the analog subscriber unit, (ii) "ring voltage" which is a relatively high voltage indicative of an incoming call, (iii) call progress tones such as dial tone, busy tone, and ringback tone. These various signals and tones will be described below.

The subscriber line interface circuit provides DC power, or "talk battery" power, along the phone lines to enable operation of circuitry in subscriber units connected to those lines. Most analog telephone systems work on DC (direct current) power. Typically, the talking battery voltage on analog phone lines is between 5 (off-hook) and 48 volts (on-hook). Talking battery must provide sufficient voltage to enable analog telephones to perform functions such as amplification and sound pickup as well as other phone circuits such as DTMF keypads and speakerphone operation. The talking battery power supply should always be available to an analog telephone, in the event the phone is placed in an off-hook, or closed-circuit state.

A subscriber line interface circuit provides a ring voltage signal to the analog subscriber unit to cause the analog phone to ring in the event of an incoming telephone call. Analog phone systems recognize a ring voltage signal placed on the phone lines by the SLIC, and in turn generate an audible electronic or mechanical ring sound to alert the subscriber of an incoming call. In order to ensure that an analog phone will recognize the ring voltage signal, the ring voltage is required to be 70 to 90 volts (or 140 to 180 volts peak-to-peak AC) at a frequency of 17 to 20 Hz.

A SLIC also passes call progress tones such as dial tone, busy tone, and ringback tone to the subscriber unit. For the convenience of the subscriber who is initiating the call, these tones are provided by the central office as an indication of call status. When the calling subscriber lifts the handset, or when the subscriber unit otherwise generates an "off hook" condition, the central office generates a dial tone and supplies it to the calling subscriber unit to indicate the availability of phone service. After the calling subscriber has dialed a phone number of the remote (answering) subscriber unit, the SLIC passes a ring back sound directed to the calling subscriber to indicate that the network is taking action to signal the remote subscriber, i.e., that the remote subscriber is being rung. Alternatively, if the network determines that the remote subscriber unit is engaged in another call (or is already off-hook), the network generates a busy tone directed to the calling subscriber unit.

The SLIC also acts to identify the status of, or interpret signals generated by, the analog subscriber unit. For example, the SLIC provides −48 volts on the ring line, and 0 volts on the tip line, to the subscriber unit. The analog subscriber unit provides an open circuit when in the on-hook condition. In a "loop start" circuit, the analog subscriber unit generates an off-hook condition by providing a termination, i.e., by closing, or "looping" the tip and ring to form a complete electrical circuit. This off-hook condition is detected by the SLIC (whereupon a dial tone is provided to the subscriber). Most residential circuits are configured as loop start circuits. Some countries, however, have other requirements. Germany, for example, requires a ground to be applied on an additional lead that acts as a control signal.

The SLIC must also be able to detect the off-hook condition during application of ring voltage. That is, when a call is incoming and the SLIC is providing the high amplitude ring voltage signal to the analog subscriber unit, the SLIC must be able to detect when the analog subscriber unit goes off-hook to answer the call. This is known as "ring trip." The SLIC must immediately cease the ring voltage signal upon detection of the off-hook condition, and provide the analog subscriber unit with the voice channel signals originating from the distant end subscriber unit.

The SLIC must also pass Dual Tone Multi-Frequency (DTMF) signals generated by the analog subscriber unit to the network. This signaling format is a well known method of providing dialing information. Each number on a keypad array is represented by two separate tones, one tone identifying the column, and the other representing the row. Together, two tones uniquely identify a digit. These tones are passed along to the network by the SLIC.

The PSTN has also been used to convey pure data signals. This has been done successfully by using voice-grade modems such as V.34, pure digital DDS services, and hybrid services such as V.90 and V.91. Of course, because the PSTN infrastructure was designed with the digital channel capacity of 64 Kbps in mind, the PSTN is inherently limited in its data throughput rate and has become increasingly insufficient to handle today's data communication needs. The development and widespread use of alternative data communication networks, such as those utilized by the internet, which is a world-wide network of computers over high-capacity communication links, has brought with it an expansion in the uses for such networks. Recently, the transmission of voice data over such high-speed data networks has become quite popular.

Present day IP telephones transport voice over a network using data packets instead of circuit switched connections over voice only networks. IP Telephony refers to the transfer of voice over the Internet Protocol (IP) of the TCP/IP protocol suite. The terms Voice over IP (VoIP) or "IP Telephony" are generally used when referring to voice over any packet network. IP Telephones originally existed in the form of client software running on multimedia PCs and provided low-cost communications over the Internet. These systems suffered from low quality voice communication due largely to the intermittent data throughput rates, resulting in excessive delay, variable delay and network congestion resulting in lost packets.

Even in such modem data communication systems capable of high throughput connections, by design, the quality of the voice signals are only comparable to that obtained with the legacy 64 Kbps $\mu$-law and A-law coding schemes. Disclosed herein is a system that provides high-fidelity voice/audio transmission that overcomes the sound quality limitations associated with the existing PSTN communication system and existing VoIP systems.

SUMMARY OF THE INVENTION

In accordance with an illustrative embodiment of the present invention, a high-fidelity voice/audio communication system is provided. According to an aspect of the illustrative embodiment, a high-fidelity SLIC (HSLIC) device is provided that combines traditional BORSCHT functionality with high fidelity sampling and compression techniques. The HSLIC preferably resides on a single plug-in line card contained within a multi-card chassis. The line card includes an analog interface that connects to a two-wire subscriber line, a high fidelity codec for sampling the analog signal at a high resolution and converting high rate digital signals to an analog signal, a voice processing client running on a microprocessor and associated digital memory. The voice-processing client forms data packets and forwards them, via a network interface circuit, to a communication network for transmission to a distant end subscriber. The high fidelity codec preferably has a sample rate of at least twenty thousand samples per second, and no less than 4096 quantization levels, and up to a sampling rate of 44.1 kHz with 65,536 quantization levels.

The voice processing client preferably includes an Internet Protocol (IP) processing client, Session Initiation Protocol (SIP) client, a Real Time Protocol (RTP) client, and other components of a communication protocol stack for establishing a connection over a packet based network by way of the network interface circuit, such as UDP and IP. The high fidelity line card preferably provides line voltage and signals to operate a standard POTS subscriber device, where the standard POTS subscriber device may or may not provide enhanced sound characteristics, such as a broadband frequency microphone and speaker. The data packets preferably contain compressed data samples, where the compression algorithm, is a negotiated configuration parameter. Further parameters include the codec type and IP address.

The line card establishes a high fidelity audio connection by obtaining the address of the called party; sending an invite request to the called party; receiving an okay signal indicating that the request was received; sending an acknowledge signal; quantizing audio information at a sampling rate greater than twenty thousand samples per second with a resolution of no less than 4096 quantization levels; and, packetizing the quantized data for transmission to a remote device.

The foregoing and other features and advantages of an illustrative embodiment of the present invention will be more readily apparent from the following detailed description, which proceeds with references to the accompanying drawings.

DETAILED DESCRIPTION OF AN ILLUSTRATIVE EMBODIMENT

Exemplary Packet Network

Figure 1:
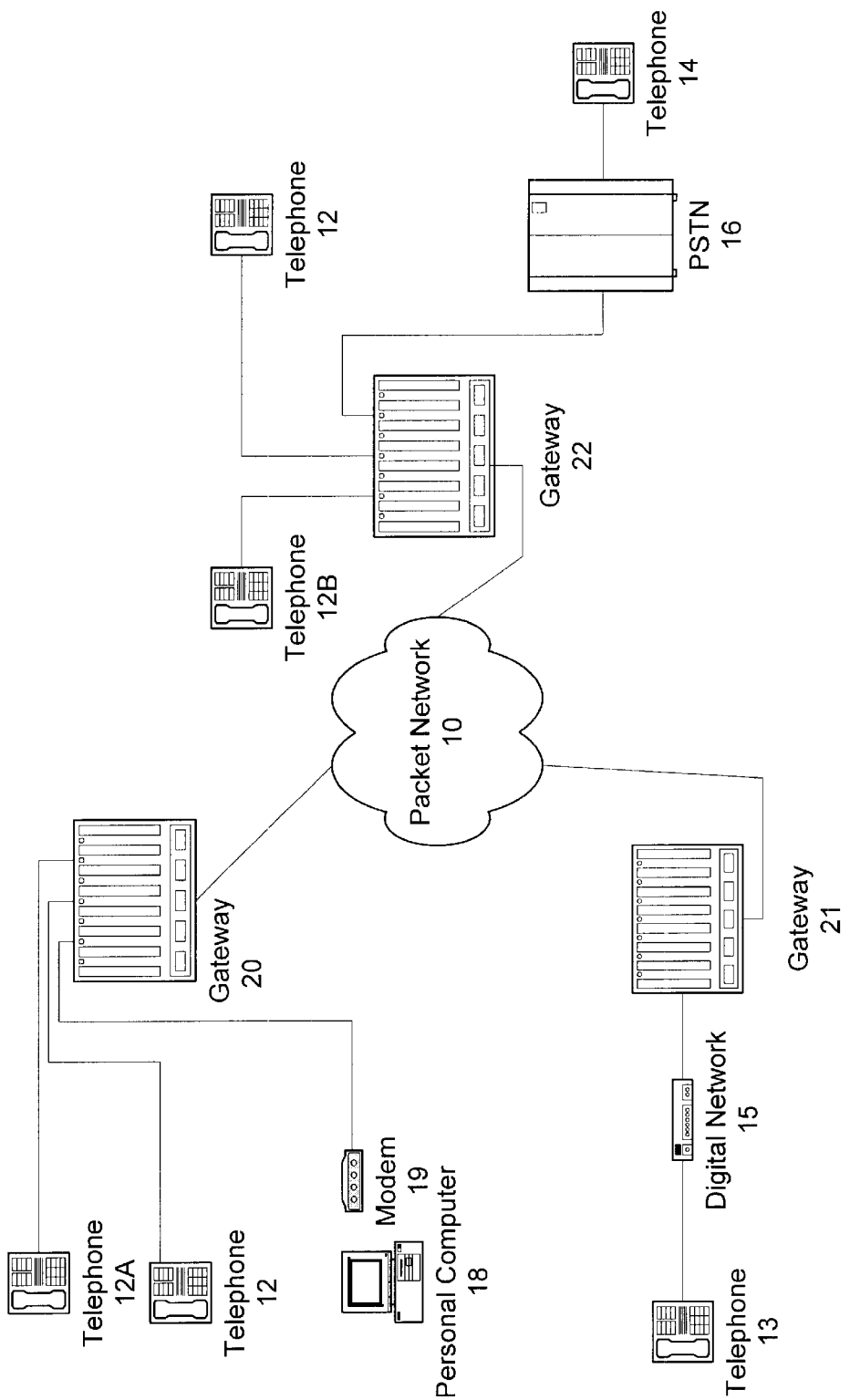
FIG. 1 shows the preferred communication network topology, including gateways having HSLIC devices connected via a packet based network.

FIG. 1 shows a simplified block diagram illustrating the high-level architecture of an exemplary packet-based network 10 (PBN) that utilizes HSLIC devices within an internet telephony gateway, or voice gateway 20, 21, 22. Analog phone calls are initiated at analog telephones 12, 12A, 12B, 13 and 14 that establish call connections to access the network 10. Preferably, the network 10 is an Internet Protocol ("IP") based digital network. Of course, the network 10 can be any of a variety of packet-based networks and interconnected digital networks including private networks, the Internet, intranets and other digital communication networks. This illustrative embodiment refers to an exemplary IP-based network for purposes of simplicity and clarity of explanation.

Also for clarity of explanation, the illustrative embodiment is directed to a Voice-over Internet Protocol ("VoIP") application. In the context of a VoIP application, the network devices providing voice access to the network may commonly be referred to as internet telephony gateways or voice gateways 20, 21, 22. The voice gateways 20, 21, 22 convert signals between the audio signals from the subscriber and streams of data packets carried over the network 10.

Generally, at the first voice gateway 20, analog telephones 12 and 12A are connected to High Fidelity Subscriber Line Interface Cards (HSLIC) where the incoming analog signals are sampled, coded, and packetized by a dedicated VoIP client within the gateway 20 to be transported as digital packets over the IP network 10. Preferably, each HSLIC has a dedicated VoIP call processing client residing on the card. This preferably includes a SIP ("Session Initiation Protocol") agent, and RTP ("Real-Time Transport Protocol") agent, and the underlying UDP and IP protocol stacks used for carrying the SIP and RTP messages. As or explained more fully below, RTP is a transport protocol particularly suited for carrying real-time data such as audio, video and simulation or other interactive data. In the HSLIC, the coded voice data is packetized and an RTP header is added to form an RTP packet. Calls are initiated by the HSLIC using the process described in H.323 or by using the SIP agent. The HSLIC cards and the gateways 20, 21, 22 may be supplemented with the media gateway control protocol (MGCP).

The gateway devices may also have plug-in cards that provide direct digital connectivity to digital networks 15, or to the public switched telephone network (PSTN) 16. This allows for connectivity to legacy telephone devices 13, 14. Those cards perform the necessary format conversion to, for example, the 64 k bit per second signal format associated with the PSTN.

SIP Sessions

The preferred embodiment utilizes the Session Initiation Protocol (SIP), which is an application-layer control protocol. SIP is more fully described in "SIP: session initiation protocol," Internet Draft, Internet Engineering Task Force, September 1998, by M. Handley, H. Schulzrinne, E. Schooler, and J. Rosenberg, the contents of which are incorporated herein by reference. The HSLIC uses SIP to manage calls over the network, and preferably conveys the messages using the UDP protocol. Alternatively, the Transfer Control Protocol (TCP) may be used. SIP includes messages necessary to identify user availability, user capabilites, call setup, and call handling. The HSLIC also uses SIP to determine the type of media and media parameters to use such as the type of compression algorithm, the availability of the called party to participate in a call, notifying the called party of the parameters to use in a call, and providing an indication to the called party of the presence of an incoming call.

H.323 Sessions

The H.323 recommendation set forth by the International Telecommunications Union (ITU), issued May 28, 1996, and the revision adopted in February, 1998 is incorporated herein by reference. H.323 describes the exchange of real time voice and data, as well as video, over a network. H.323 describes how aspects of many other protocols may be integrated, such as H.225.0 packet and synchronization; H.245 control; H.261 and H.263 video codecs; G.711, G.722, G.728, G.729, and G.723 vocoders; and the T.120 series of multimedia communications protocols. H.323 may be used to manage the call processing of the HSLIC, but SIP is preferred.

The call control functions of the H.323 terminal include signaling for call setup, capability exchange, signaling of commands and indications, and messages to open and describe the content of logical channels. The H.323 control layer provides framing, sequencing and error control, and formats the data into network packets. H.323 utilizes three separate signaling functions: the H.245 Control Channel, the Q.931 Call Signalling Channel, and the RAS Channel. The H.245 Control Channel is a reliable channel that carries control messages governing operation of the H.323 entity, including capabilities exchange, opening and closing of logical channels, preference requests, flow control messages, and general commands and indications. Capabilities exchange is one of the fundamental capabilities in the ITUrecommendation; H.245 provides for separate receive and transmit capabilities as well as for methods to describe these details to otherH.323 terminals. There is only one H.245 Control Channel per call. The Call Signalling Channel uses Q.931 to establish a connection between two terminals.

MGCP Sessions

Media Gateway devices are controlled using the Media Gateway Control Protocol (MGCP). In an IP network, the Media Gateway provides the functionality of a router and directs packets to multiple internal and external interfaces. Thus, the MGCP protocol may be used to configure the HSLIC cards. In fact many of the functions described here may be performed with the use of MGCP, including call processing, but SIP is the preferred method of handling call processing functions.

RTP Sessions

Real Time Protocol (RTP) is primarily designed to provide end-to-end network transport functions suitable for real-time network applications such as a VoIP application transmitting real-time audio data over the network. The RTP protocol features timing reconstruction, loss detection, security and content identification. RTP does not provide for any kind of lost packet recovery or forward error correction. RTP is more fully defined by the Internet Engineering Task Force "RTP: A Transport Protocol for Real-Time Applications" presently available at http://search.ietf.org/internet-drafts/draft-ietf-avt-rtp-new-03.txt, which is a revision of RFC 1889, and authored by V. Jacobson, Stephen Casner, R. Frederick, H. Schulzrinne, dated Mar. 4, 1999, which is fully incorporated herein by reference. RTP is designed to optimize the end-system processing speed for the real-time data such as interactive voice and video data. The RTP packets are themselves transported within another protocol such as UDP (Unreliable Datagram Protocol) packets on the IP network. UDP provides multiplexing and checksum services, however, RTP may be used with a variety of different underlying network or transport protocols as known to those of skill in the art and those yet to be promulgated. A router function in the gateway 20 directs the RTP packets onto the IP network 10 that transports the packet to the destination voice gateway 23 or gateway 21.

The HSLIC call processing agent inserts into the RTP packet header a payload type parameter that indicates the type of compression algorithm in use. Specifically, this parameter indicates that the voice has been sampled with high resolution at a rate much higher than 8 kHz, preferably in a range of 20 kHz to 50 kHz, with 12–16 bit resolution, and more preferably at a rate of 44.1 kHz with 16 bits (i.e., 65,536 linearly spaced quantization levels for 16 bits, or 4096 levels for 12 bit quantization). In addition, other parameters such as the packetization interval, the use of silence suppression, and the use of comfort noise during silences are specified. The specification set forth in draft-ietf-avt-profile-new-05.txt, which is a revision to RFC 1890 and is incorporated herein by reference, defines parameters for various payload types. Additional payload types may be defined for use with the HSLIC using Dynamic or Unassigned types within the RTP header. These additional types are preferably specified within the Session Description Protocol (SDP) that is in turn part of a SIP message.

Figure 2:
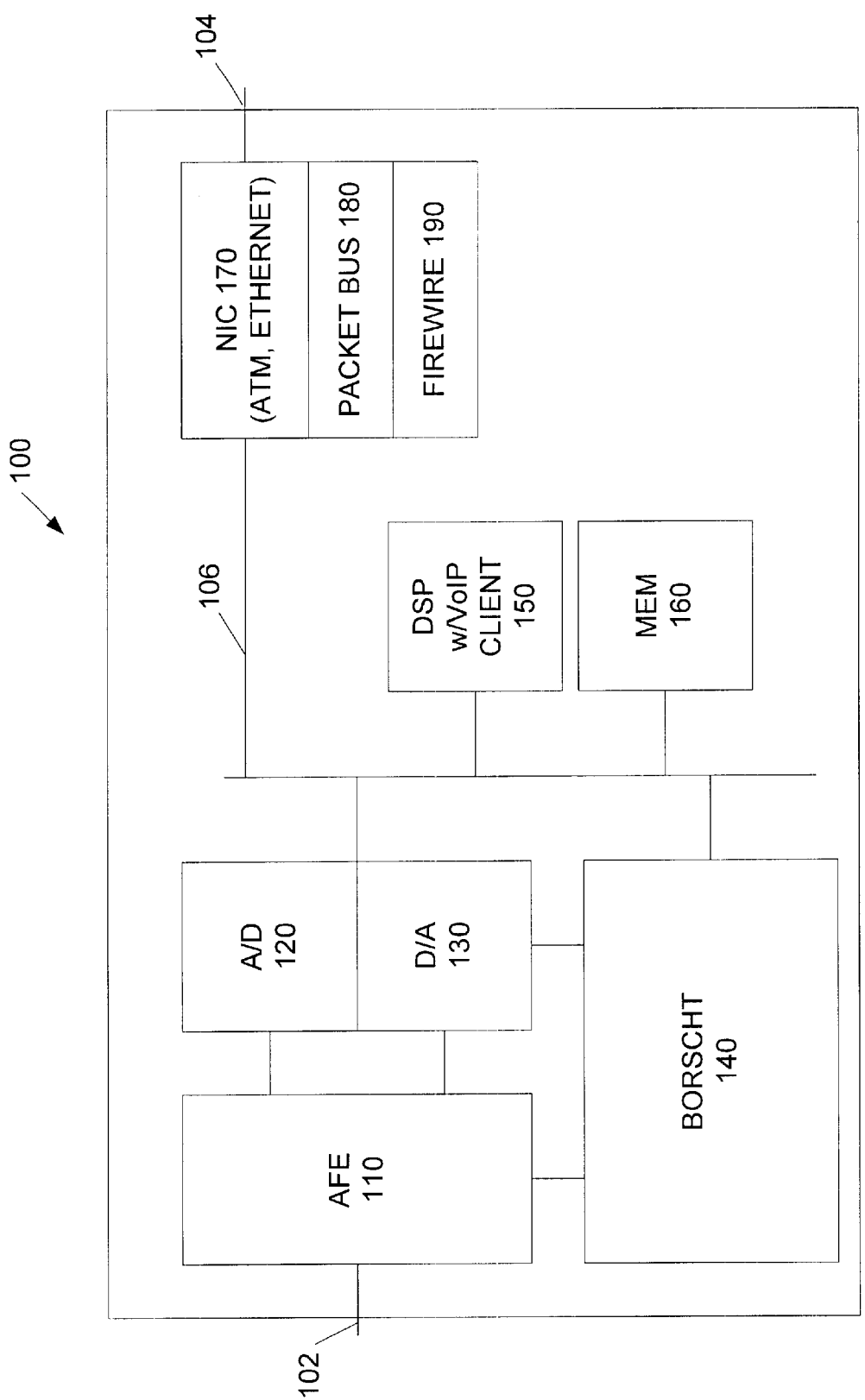
FIG. 2 shows a preferred embodiment of the HSLIC device.
Figure 3:
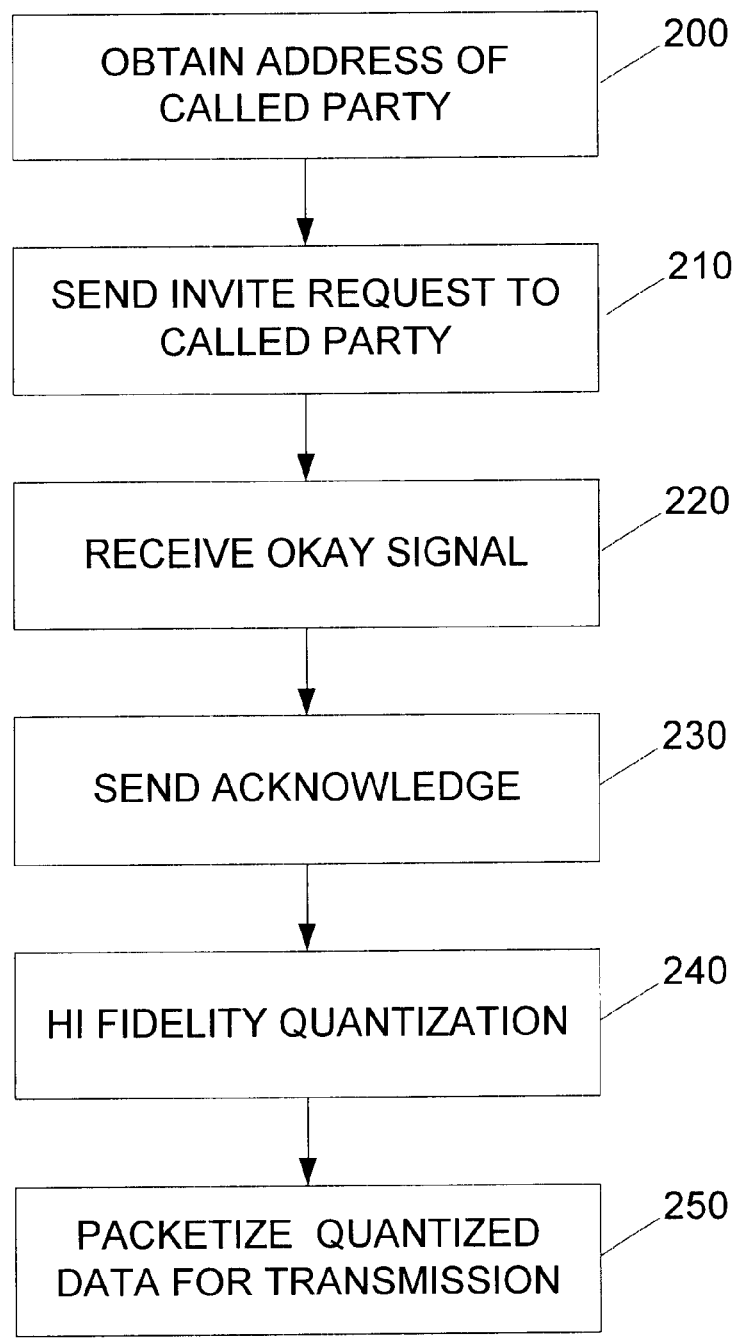
FIG. 3 shows a flow diagram of the call connection process.

The HSLIC is depicted in FIG. 2. It includes an input 102 to the analog front end (AFE) circuit 110, an A/D and D/A converter (CODEC) 120, 130, a BORSCHT circuit 140, a communication bus 106, digital signal processor (DSP) 150, memory 160, a network interface card (NIC) 170, and an output 104. The NIC 170 may be replaced with a packet bus 180 as set forth in U.S. Pat. No. 5,528,595, which is incorporated herein by reference, or by Firewire 190, as defined by IEEE specification 1394, which is also incorporated herein by reference.

The AFE includes a hi-fidelity hybrid that exhibits a flat frequency response over the frequency range of interest, i.e., 100 Hz–20 kHz. The hybrid separates the two-wire communication circuit, which also commonly referred to as the local loop, connected to input 102 into a four-wire circuit—two transmit and two receive. The AFE transmits signals received from D/A 130 and provides incoming signals to A/D 120. The AFE and hybrid also contain impedance matching circuitry as known in the art to provide echo prevention/cancellation. The hybrid circuit utilizes components having a relatively broad frequency range compared to standard telephony devices. The AFE is designed to communicate with hi-fidelity telephone devices having speaker devices responsive to a 100 Hz to 20 kHz frequency range, and a microphone that is sensitive to the same range, or alternatively in the 100 Hz to 10 kHz range. The terminal devices, or hi-fidelity telephones, also preferably have auxiliary inputs so that hi-fidelity signal sources and sound processing equipment may be connected so as to utilize the network. With such a configuration, commercially available hi-fidelity amplifiers and loudspeakers may be connected for playing the received signals, and various audio sources, including external microphones, compact disks, tapes, and the like may be transmitted to a distant end device.

When operating in the hi-fidelity mode, the A/D converter 120 and D/A converter 130, together with any associated processing such as $\mu$-law and A-law coding, adaptive PCM (ADPCM), etc., (collectively referred to herein as a codec), preferably operate at a conversion rate of 44.1 kHz, and a resolution of 16 bits per sample. The quantization levels are preferably linear, as opposed to logarithmic. The codec, in combination with the coding and compression performed by the DSP 150, is backward compatible with legacy $\mu$-law and A-law codecs so that hi-fidelity devices may communicate with legacy telephones and the PSTN circuit-switched network.

The BORSCHT circuit 140 provides the same functionality as legacy subscriber line interface cards to compatible with older devices. This functionality may be selectively disabled to allow the use of more modern VoIP call progression signals such as ring signal, off-hook detection, dial tone and dialing. BORSCHT circuit 140 interfaces to the codec converters 120/130 and the AFE 110.

The NIC circuit 170 provides an interface to the packet based network. The network may be any suitable packet network, such as ethernet, ATM (Asynchronous Transfer Mode), or the like. Alternatively, the HSLIC may communicate with the PBN elements such as network routers using a packet bus 180 or using the IEEE 1394 Firewire protocol 190. The bus 106 enables communication between the DSP 150, the memory 160, the converters 120/130, the NIC 170, and the BORSCHT circuit 140.

The HSLIC interface card 100 preferably includes a SIP client residing on the HSLIC itself, as opposed to an external server or gateway. Having SIP clients residing on each HSLIC card effectively decentralizes the call processing because each HSLIC card does not depend on a gateway controller. The intelligent and independent nature of the HSLIC device also provides scalability of the gateway without having to reconfigure or redesign a central gateway controller to increase call handling capacity. The program instructions corresponding to the SIP client are stored in program memory and executed on a microprocessor or DSP 150 on the HSLIC card 100. Of course, the gateways 20, 21, 22 may be configured with central processing units that handle a plurality of HSLIC interface cards, but at the sacrifice of the above-mentioned benefits.

The SIP client begins the network connection in response to a user request by querying a proxy server to obtain the IP address of the called party. The query can be done by phone number, SIP address, or even email address. The IP address of the proxy server is preferably preprogrammed into the HSLIC card, but the proxy server selection may also be dynamically performed, for example, by the Gateway Management Control Protocol (GMCP). The proxy server contacts a location service to obtain the address, e.g., IP address, of the called party. The proxy server then provides the calling SIP client with the IP address of the called party. The calling SIP agent then formulates an INVITE request to the called party. The INVITE request typically contains a session description that provides the called party with enough information to join the call. Of course, if a user is logged into more than one location, the location service may return more than one address. The calling SIP agent can sequentially or in parallel try the addresses until the call is successful or the callee has declined the call. Alternatively, the calling SIP client can issue an INVITE request to the proxy server, which then may issue the INVITE message to the callee on behalf of the calling party.

The distant end SIP agent residing on the contacted remote gateway, e.g., gateway 21 or gateway 22, alerts the called party of an incoming request. It then returns an OKAY message to the first HSLIC card residing in gateway 20 if the call is accepted. This indicates to the calling HSLIC card that the call was successful. The caller's HSLIC SEP agent then sends an ACK message to the callee's HSLIC SIP agent.

RTP is then used to transmit voice data packets over the PBN 10. Communication continues until the HSLIC SIP agent on either side performs call tear down by sending a BYE message, which is okayed by the other SIP agent.

The present embodiment preferably includes logic to implement the described methods in software modules as a set of computer executable software instructions. The Computer Processing Unit ("CPU") or microprocessor implements the logic that controls the operation of the channel card. The microprocessor executes software that can be programmed by those of skill in the art to provide the described functionality. The software can be represented as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described in further detail below.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A line card apparatus comprising:
   an analog interface adapted for connection to a two-wire subscriber line for providing call progression signals;
   a high fidelity codec connected to said analog interface;
   a voice processing client including a microprocessor, said client connected to said analog interface and to said high fidelity codec;
   said client further comprising a digital memory connected to said microprocessor having program instructions to direct said microprocessor to accept data from said high fidelity codec and to form data packets;
   a network interface circuit connected to said client and adapted for connection to a communication network, wherein said network interface circuit enables transmission of said data packets to the communication network.

2. The line card of claim 1 wherein said high fidelity codec has a sample rate of at least twenty thousand samples per second.

3. The line card of claim 1 wherein said high fidelity codec has no less than 4096 quantization levels.

4. The line card of claim 1 wherein said voice processing client includes an Internet Protocol processing client.

5. The line card of claim 1 wherein said voice processing client includes a Session Initiation Protocol client.

6. The line card of claim 1 wherein said voice processing client includes a protocol stack for establishing a connection over a packet based network by way of said network interface circuit.

7. The line card of claim 1 wherein said analog interface circuit provides line voltage and signals to operate a standard POTS subscriber device.

8. The line card of claim 7 wherein said standard POTS subscriber device provides enhanced frequency characteristics.

9. The line card of claim 1 wherein said packets contain compressed data samples.

10. The line card of claim 1 wherein said voice processing client includes a Real Time Protocol client.

11. The line card of claim 1 wherein said line card has associated with it a plurality of configuration parameters, said parameters including codec type and IP address.

12. A method of establishing a high fidelity audio connection comprising the steps of:
    sending an invite request to a called party over a communication network;
    receiving an okay signal indicating that the request was received;
    sending an acknowledge signal;
    quantizing audio information at a sampling rate greater than twenty thousand samples per second with a resolution of no less than 4096 quantization levels; and,
    packetizing the quantized information for transmission to a remote device.

13. The method of claim 12 further comprising the step of querying a proxy server to obtain an address of the called party.

14. The method of claim 13 wherein the query includes information regarding the called party's identity, said information being one of the following: a SIP address, a phone number, and an email address.

* * * * *